United States Patent [19]

Anderson

[11] Patent Number: 4,520,742

[45] Date of Patent: Jun. 4, 1985

[54] SEED PLANTER ATTACHMENT FOR CHISEL PLOW

[76] Inventor: Steven Anderson, Star Rte., Arlington, Oreg. 97812

[21] Appl. No.: 650,576

[22] Filed: Sep. 14, 1984

Related U.S. Application Data

[63] Continuation of Ser. No. 522,328, Aug. 11, 1983, abandoned.

[51] Int. Cl.³ ............................................. A01C 5/06
[52] U.S. Cl. ...................................... 111/86; 111/84; 111/85
[58] Field of Search .................... 111/85, 86, 84, 73

[56] References Cited

U.S. PATENT DOCUMENTS

| | | | |
|---|---|---|---|
| 1,242,591 | 10/1917 | Raulz | 111/85 |
| 1,864,280 | 6/1932 | Scarlett | 111/52 |
| 1,897,355 | 2/1933 | Altgelt | 111/52 |
| 2,159,652 | 5/1939 | Brunner | 111/73 |
| 2,539,592 | 1/1951 | Prince et al. | 111/85 |
| 2,881,721 | 4/1959 | Hyland et al. | 111/85 |
| 2,975,844 | 3/1961 | Oehler et al. | 172/484 |
| 3,306,241 | 2/1967 | Copple | 111/85 X |
| 4,393,791 | 7/1983 | Suderman | 111/86 X |

Primary Examiner—Robert A. Hafer
Assistant Examiner—Danton DeMille
Attorney, Agent, or Firm—Chernoff, Vilhauer, McClung, Birdwell & Stenzel

[57] ABSTRACT

An attachment for a chisel plow comprising a seed planter resiliently connected to the shank of the chisel plow by means of a leaf spring rod, and gauge wheels detachably connected to the seed planter for maintaining a constant planting depth relative to the ground. The resilient rod provides lateral support for the seed planter so that structural connection to the plow frame is unnecessary.

5 Claims, 4 Drawing Figures

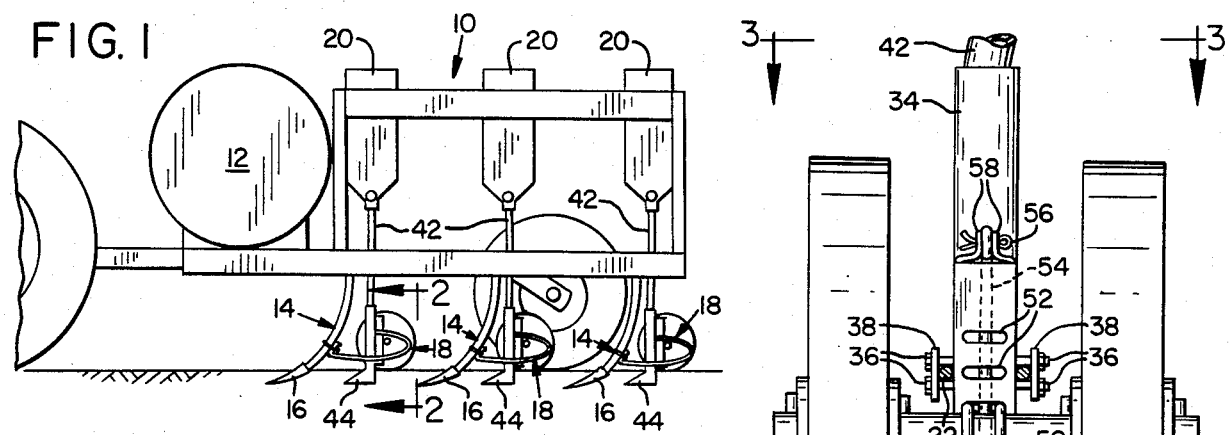
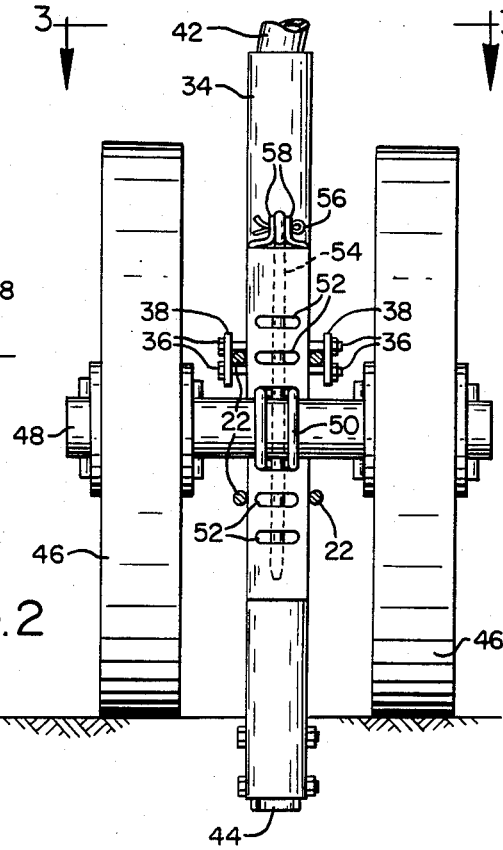
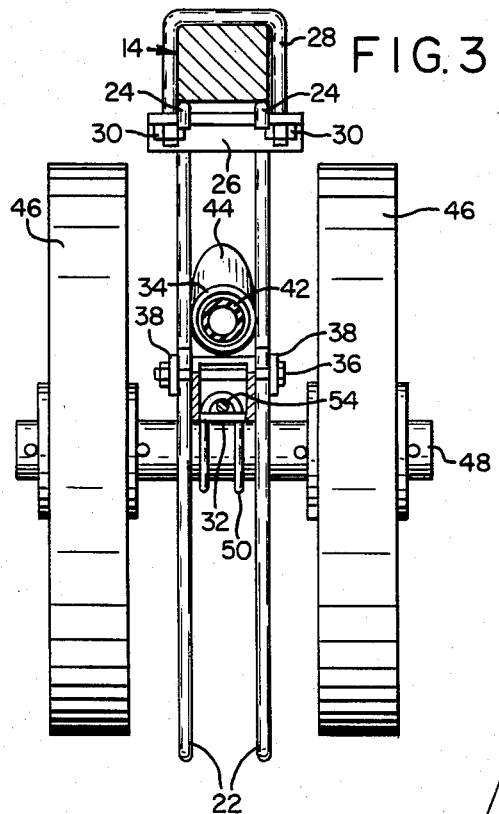
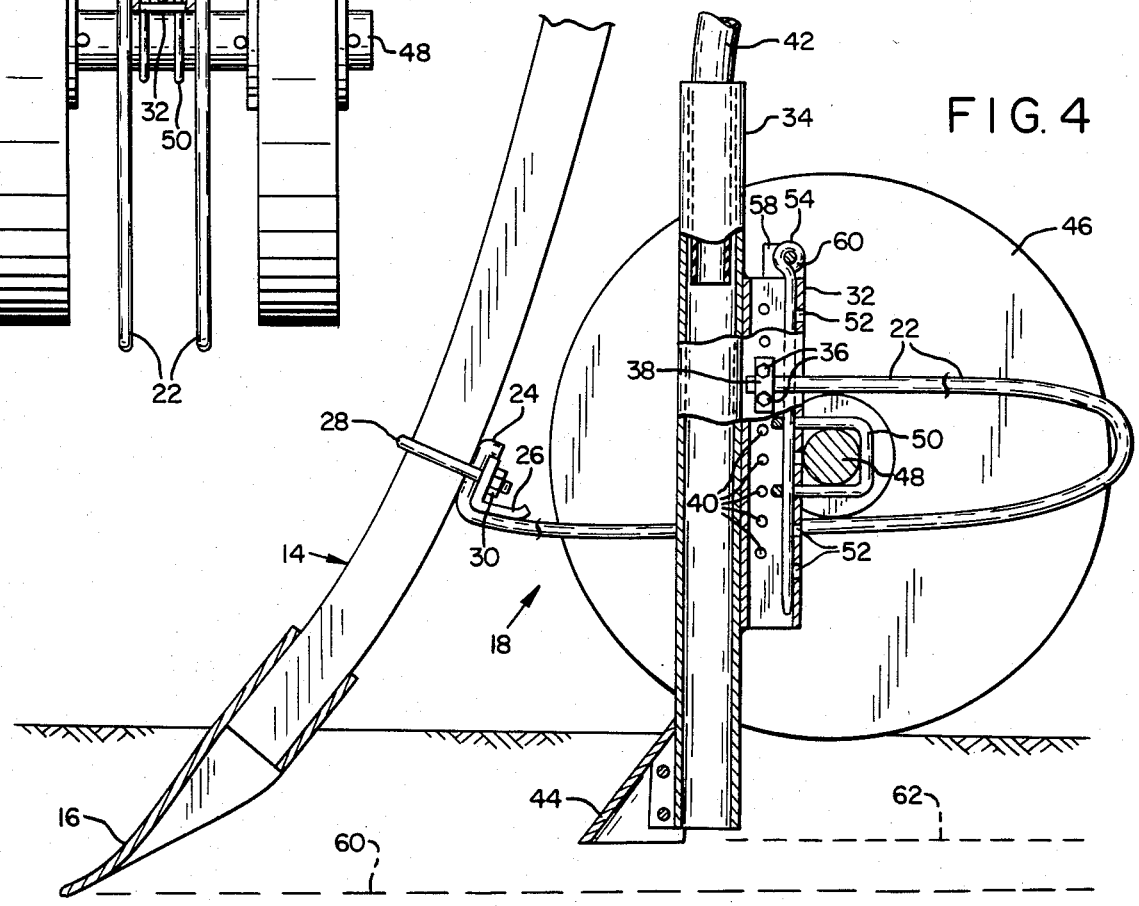

SEED PLANTER ATTACHMENT FOR CHISEL PLOW

This is a continuation of application Ser. No. 522,328, filed Aug. 11, 1983, now abandoned.

BACKGROUND OF THE INVENTION

The present invention relates to a seed planter attachment for a plow, and more particularly to a chisel plow for use in no-till plowing in which the planter is resiliently mounted to the rear of the plow shank and means are provided to insure a constant seed planting depth.

Certain sections of the country, due to the arid climate and lack of a stable top soil, are cultivated using no-till farming methods. According to this method, a frame having a plurality of chisel plows is drawn behind a tractor or the like. The chisels are relatively narrow implements which dig furrows into the ground without exposing an appreciable amount of topsoil. Such plows also include a fertilizer knife for laying a small amount of fertilizer in the furrows. Seeds are subsequently deposited by the use of seed planters mounted rigidly to the chisel plows or to the frame so as to drop seeds into the furrows created by the plows. Examples of two such devices are shown by the Prince, U.S. Pat. No. 2,539,592 and Bruner, U.S. Pat. No. 2,195,652.

The Bruner device is bolted directly to the plow shank on a heavy support arm. The support arm and an associated brace plate maintain the height of the seed planter in fixed relation to the lower end of the chisel plow. In the Prince device, the seed planter is rigidly attached to the plow shank by means of a U-shaped clamping bracket.

The principal disadvantage of both the Prince and Bruner devices is that the depth of the deposited seeds can vary depending upon the soil conditions encountered by the plow. Since the plow is relatively heavy, it will dig deeper into soft broken soil than into hard, rocky soil. Since the planter is fixedly attached to the plow it deposits seeds at a depth that is constant relative to the plow. Thus, seeds can be deposited at uneven depths. In no-till farming it is more desireable to have seeds planted at a constant depth regardless of soil conditions. Another disadvantage of the Bruner and Prince devices is that obstacles encountered by the plow, such as rocks, can damage the planter since it has no resilience in a vertical direction so as to slide over such obstacles. The planter is normally of a lighter construction than the heavier and more rugged plow shank, and is thus more susceptible to damage.

In other designs unrelated to no-till farming, such as shown in the Scarlett, U.S. Pat. No. 1,864,280 and Altgelt, U.S. Pat. No. 1,897,355, a plow shank and seeder combination is mounted resiliently to the frame, but the seeder is rigidly mounted with respect to the plow shank. Thus, although the combination can respond to variable soil conditions, and there is less likelihood of damage from ground obstacles, this seed planter suffers from the same disadvantages as those occasioned by the Prince and Bruner devices. That is, the seeds are planted at uneven depths. It is critical for no-till farming, however, that seed depth remain constant regardless of the soil depth of the plow shank.

In yet another type of design, shown for example in the Oehler U.S. Pat. No. 2,975,844, a seed planter shoe is resiliently attached to a frame. Also attached to the frame ahead of the shoe is a plow. The seed planter has a depth adjustment feature consisting of a press wheel which maintains the planter at a constant depth relative to the ground regardless of the depth of the furrow opened by the plow. While this type of device addresses some of the problems noted above, it is an integrated device consisting of complicated linkage mechanism between the seed planter, the press wheel and the frame. As such, it would not be convenient for use as an attachment for an existing chisel plow.

SUMMARY OF THE INVENTION

The present invention comprises an attachment for a chisel plow including a seed planter resiliently connected to the shank of a chisel plow by means of a leaf spring rod, and gauge wheel means connected to the seed planter for maintaining a constant planting depth relative to the ground regardless of soil conditions and regardless of the depth of the furrow created by the plow. The invention is adapted to be attached directly to the shank of a chisel plow without ancillary equipment on the frame supporting the seed planter other than a tube insert through which seeds may be deposited into the planter. For example, the invention is particularly adaptable to be retrofitted to an existing chisel plow or cultivator such as that manufactured by Calkins Manufacturing Company of Spokane, Washington and designated a 1600 Series Chisel Plow. By using a leaf spring rod to attach the seed planter to the rear of the chisel plow, problems associated with obstacles encountered in the ground, such as rocks, which would otherwise damage a rigidly attached seed planter, are obviated. The spring is ordinarily biased in a downward direction to maintain contact between the ground and a pair of gauge depth wheels disposed on either side of the seed planter. The gauge wheels are detachably connected to the seed planter by means of an ajustable U-bolt and rod arrangement which keeps the seed planting depth constant relative to the ground regardless of the depth of the furrow opened by the plow. The planting depth may be adjusted by means of a U-shaped chain link which engages the axle of the gauge wheels. The ends of the U-shaped link are inserted into slots in the rear of a bracket on the seed planter and an elongate rod engages the partial loops of the link which protrude through slots in the bracket.

It is an object of this invention to provide a seed planter resiliently mounted to a plow shank so as to absorb forces acting vertically on the seed planter without damage thereto.

It is a further object of this invention to provide a seed planter which plants seeds at a constant soil depth regardless of soil conditions or ground contour.

It is a still further object of this invention to provide an adjustable depth seed planter wherein the adjustment is made quickly and with a minimum of small attaching parts which could become easily lost.

As still further object of this invention is to provide a seed planter attachment for a chisel plow which can be retrofitted to existing chisel plows with a single connection to the plow shank without the necessity of attaching the seed planter to the frame.

These and other objects of the invention will become apparent from the description of the drawings and detailed description of the invention which follows.

BRIEF DESCRIPTION OF THE DRAWINGS

Reference is now made to the drawings in which:

FIG. 1 is a side view of a conventional chisel plow mechanism having the seed planter attachments of the invention mounted thereto.

FIG. 2 is a rear view of the seed planter attachment in FIG. 1 on an enlarged scale taken along line 2—2 of FIG. 1.

FIG. 3 is a partially cutaway top view of the seed planter in FIG. 2 taken along line 3—3.

FIG. 4 is a partially cut-away side view of the seed planter attachment.

DETAILED DESCRIPTION OF THE INVENTION

Referring to FIG. 1, a tractor or other powered device (not shown) pulls a frame 10 on which is mounted a tank 12 which supplies fertilizer to a plurality of chisel plows 14, each having a fertilizer knife 16 mounted thereon. Attached to the shank of each chisel plow is a seed planter attachment 18. Seeds are supplied to the seed planter attachments by containers 20 mounted on the frame 10. The seed containers have appropriate metering devices (not shown) which regulate the flow of seeds to the seed planters.

Referring now to FIGS. 3 and 4, the seed planter 18 is connected to the plow shank 14 by a pair of leaf spring rods 22. The spring rods have hooked portions 24 which overhang an L-shaped retaining plate 26. The retaining plate 26 is held against the plow shank by a U-bolt 28 and nuts 30. The opposite ends of the leaf spring rods 22 are connected to a bracket 32 of square cross section fixedly attached to a seed planter boot 34. The spring rods 22 are held within the bracket 32 by a pair of bolts 36 and retaining members 38. The seed planter may be made adjustable relative to the plow shank by attaching the spring rods at the appropriate pair of holes 40, vertically spaced along bracket 32. A hose 42 lies loosely within the seed planter boot 34. There is no other connection between the seed planter attachment and the frame. The seed planter boot 34 has a foot 44 which creates a shallow furrow in the earth already broken by chisel plow 14.

In order to keep the depth of the seed planter constant relative to the surface of the ground, a pair of gauge depth wheels 46 are connected to the seed planter at bracket 32. The connection is made by detachably gripping the axle 48 supporting the gauge depth wheels 46 with a U-shaped link member and retaining rod combination. The U-shaped link member 50 comprises an elongate link such as a chain link bent at right angles in two places to form a generally U-shaped member when viewed from the side as in FIG. 4. The bracket 32 has a plurality of slots 52, FIG. 2, spaced apart so as to engage the ends of the link 50. The looped ends of the link 50 are inserted through a pair of the slots 52 thereby gripping the axle 48 to the rear of the bracket 32. The ends of the link 50 form partial loops in the interior of the bracket 32, and a retaining rod 54 is inserted through these partial loops thereby holding the ends of the link 50 within the bracket 32. This retains the gauge depth wheels at a fixed vertical position relative to the bottom of the seed planter. A cotter pin 56 inserted through two L-shaped retaining brackets 58 engages an upper looped end 60 of the retaining rod 54 and holds it in place.

In actual operation the seed planter attachment 18 is mounted to a chisel plow 14 by clamping the spring rods 22 to the rear of the plow with a U-bolt 28 as discussed above. Having been mounted to the rear of the plow shank, all that remains to place the unit into operation is to insert the hose 42 into the seed planter boot 34. No other connection between the seed planter and the frame to which the plow shank is attached is necessary since the structual connection is made solely through spring rods 22. Because of the lateral stiffness of the spring rods the seed planter will follow the furrow created by the chisel plow. Thus, if the plow shank were to hit a rock and be forced sideways the planter would likewise move to the side and avoid the rock. In the event that the plow was to be forced upwardly due to a hard obstruction such as a large rock, the planter would not be damaged because of the resiliency of the spring rods to forces acting in a vertical direction.

The depth of the planting remains constant relative to the surface of the ground because of the gauge wheels which are maintained in fixed relation to the bottom of the seed planter by the U-bolt and retaining rod attaching means. Constant seed planting depth is important because the seeds will not germinate if planted too deeply or may be "burned" by planting too close to the fertilizer. Fertilizer is injected into the soil a by fertilizer knife 16 at a level shown by the broken line 60 in FIG. 4. This depth can vary depending upon the condition of the soil and the contour of the ground. Such variations are not critical for fertilizing, but would be critical for seed planting. As shown by broken line 62 in FIG. 4, the rigid connection of the gauge depth wheels to the seed planter bracket insures that the seed will always be planted at a uniform depth, except when obstacles are encountered which would tend to push against the bias of the spring rod raising the seed planter in a vertical direction. In such a case the seed planter is preserved from damage by the resilience of the leaf spring rods. The normal situation, however, is that the wheels are biased against the ground and thus the seed will be planted at the uniform depth indicated by broken line 62.

The terms and expressions which have been employed in the foregoing specification are used therein as terms of description and not of limitation, and there is no intention, in the use of such terms and expressions, of excluding equivalents of the features shown and described or portion thereof, it being recognized that the scope of the invention is defined and limited only by the claims which follow.

What is claimed is:

1. A seed planter attached to a vertically oriented chisel plow shank, said seed planter comprising:
   (a) a boot;
   (b) spring means for mounting said boot in a rearwardly related position from the shank and for imparting a ground engaging bias to said boot;
   (c) mounting means for removably and infinitely variably attaching said spring means to said shank at any vertical location along the length thereof so as to adjust the amount of said ground engaging bias;
   (d) depth regulating means for regulating the depth of penetration of said boot into the ground independent of the depth the chisel plow penetrates the ground; and
   (e) depth adjustment means interconnecting said boot and said depth regulating means for adjusting the depth at which said boot penetrates the ground.

2. The seed planter of claim 1 wherein the adjustment of said mounting means and said depth adjustment means are independent.

3. The seed planter of claim 1 wherein said spring means provides the sole longitudinal and lateral support for the planter relative to the shank.

4. The seed planter of claim 1 wherein said spring means comprises at least one resiliently flexible rod.

5. The seed planter of claim 4 wherein said flexible rod is a U-shaped element having two generally horizontal legs the ends of which are attached respectively to said boot and the shank.

* * * * *

UNITED STATES PATENT AND TRADEMARK OFFICE
CERTIFICATE OF CORRECTION

PATENT NO. : 4,520,742

DATED : June 4, 1985

INVENTOR(S) : STEVEN ANDERSON

It is certified that error appears in the above-identified patent and that said Letters Patent is hereby corrected as shown below:

Column 1, line 15:
Change "top soil" to --topsoil--

Column 2, line 58:
Change "As" to --A--

Column 4, line 21:
After the word "soil", delete the word "a"

Column 4, line 44:
Change "portion" to --portions--

Column 1, line 43:
Change "desireable" to --desirable--

Column 3, line 9:
Change "cut-away to --cutaway--

Signed and Sealed this

Fifth Day of August 1986

[SEAL]

Attest:

Attesting Officer

DONALD J. QUIGG

Commissioner of Patents and Trademarks